(12) United States Patent
Lingala et al.

(10) Patent No.: US 11,011,049 B2
(45) Date of Patent: May 18, 2021

(54) SAFETY ASSISTANCE ON VEHICLE TEST RIDE

(71) Applicant: Carrier Corporation, Palm Beach Gardens, FL (US)

(72) Inventors: Ramesh Lingala, Hyderabad (IN); Biswaranjan Pattanaik, Nayagarh (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/738,135

(22) Filed: Jan. 9, 2020

(65) Prior Publication Data
US 2020/0250961 A1 Aug. 6, 2020

(30) Foreign Application Priority Data

Feb. 5, 2019 (IN) .............................. 201911004461

(51) Int. Cl.
G08B 25/12 (2006.01)
B60R 25/24 (2013.01)
B60R 25/102 (2013.01)
G06F 3/01 (2006.01)
G08B 25/00 (2006.01)
G01S 19/42 (2010.01)
G08B 25/10 (2006.01)

(52) U.S. Cl.
CPC ............ G08B 25/12 (2013.01); B60R 25/102 (2013.01); B60R 25/24 (2013.01); G06F 3/017 (2013.01); G08B 25/008 (2013.01); *G01S 19/42* (2013.01); *G08B 25/10* (2013.01)

(58) Field of Classification Search
CPC .. G08B 25/01; G08B 21/0297; G08B 25/016; H04M 1/72538
See application file for complete search history.

(56) References Cited

U.S. PATENT DOCUMENTS

2006/0229780 A1* 10/2006 Underdahl .............. B60R 25/00
701/29.3
2012/0282886 A1* 11/2012 Amis ................ H04M 1/72541
455/404.2

OTHER PUBLICATIONS

Velayanikal, Malavika, A Women's Day app: Shake and Activate, Mar. 8, 2014, YourStory.

* cited by examiner

*Primary Examiner* — Hongmin Fan
(74) *Attorney, Agent, or Firm* — Carlson, Gaskey & Olds, P.C.

(57) ABSTRACT

In one exemplary embodiment, a method of providing safety assistance on a test ride of a vehicle includes opening a locking device to provide access to a vehicle access component. A safety protocol is initiated with a computerized device. The vehicle is operated with the vehicle access component. A gesture is performed with the computerized device to summon assistance.

18 Claims, 2 Drawing Sheets

SAFETY ASSISTANCE ON VEHICLE TEST RIDE

CROSS-REFERENCE TO RELATED APPLICATIONS

This application claims priority to Indian Provisional Application No. 201911004461 filed on Feb. 5, 2019.

BACKGROUND

The disclosure relates to a method and system for providing safety assistance on a vehicle test ride.

Automobile dealerships and vehicle rental businesses frequently provide temporary access to a vehicle for the purpose of a test drive or rental access. Typically, a salesperson from a dealership, in particular, will accompany the prospective customer on the drive. In rare instances, the prospective customer may threaten or intimidate the salesperson, such that the salesperson wishes to seek help or report the incident.

SUMMARY

In one exemplary embodiment, a method of providing safety assistance on a test ride of a vehicle includes opening a locking device to provide access to a vehicle access component. A safety protocol is initiated with a computerized device. The vehicle is operated with the vehicle access component. A gesture is performed with the computerized device to summon assistance.

In a further embodiment of the above, the initiating step is performed in response to the locking device opening step.

In a further embodiment of any of the above, the opening step is performed using the computerized device.

In a further embodiment of any of the above, the vehicle access component is at least one of a key and/or a key fob.

In a further embodiment of any of the above, the summoned assistance includes a step of documenting a return of a prospective customer to a building.

In a further embodiment of any of the above, the summoned assistance includes a step of activating an alarm on at least one of the computerized device and/or the vehicle.

In a further embodiment of any of the above, the summoned assistance includes a step of alerting a remote location that includes at least an office and/or a rescue personnel.

In a further embodiment of any of the above, the alert includes sending a location of the vehicle.

In a further embodiment of any of the above, the summoned assistance includes a step of providing a video and/or an audio recording in the vehicle with the computerized device.

In a further embodiment of any of the above, the method includes the step of terminating the safety protocol when the vehicle access component is returned to the locking device.

In a further embodiment of any of the above, the method includes the step of confirming the gesture to the user with the computerized device.

In a further embodiment of any of the above, the initiating step includes monitoring for a predetermined gesture from the user associated with an emergency event.

In a further embodiment of any of the above, the gesture is a sequence of computerized device movements between desired computerized device orientations.

In a further embodiment of any of the above, the sequence of computerized device movements includes moving the computerized device from a first position in a first direction 90° to a second position, and then from the second position in 180° in a second direction opposite the first direction to a third position, and then from the third position 90° back to the first position.

In another exemplary embodiment, a safety assistance system for use during vehicle test rides includes a locking device containing a vehicle access component. The locking device is configured to provide access to the vehicle access component in response to a request signal. A remote location has an alert receiver configured to receive an alert signal. A computerized device has a software application configured to interface with the locking device. The software application has a safety protocol configured to be initiated in connection with the request signal. The safety protocol is configured to send the alert signal in response to a user gesture with the computerized device.

In a further embodiment of any of the above, the computerized device is configured to send the request signal.

In a further embodiment of any of the above, the remote location corresponds to an office having surveillance equipment. The surveillance equipment is configured to record a return of a prospective customer in response to the alert signal.

In a further embodiment of any of the above, the remote location houses rescue personnel.

In a further embodiment of any of the above, the computerized device is configured to confirm the user gesture to the user.

In a further embodiment of any of the above, the locking device is configured to terminate the safety protocol when the vehicle access component is returned to the locking device.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
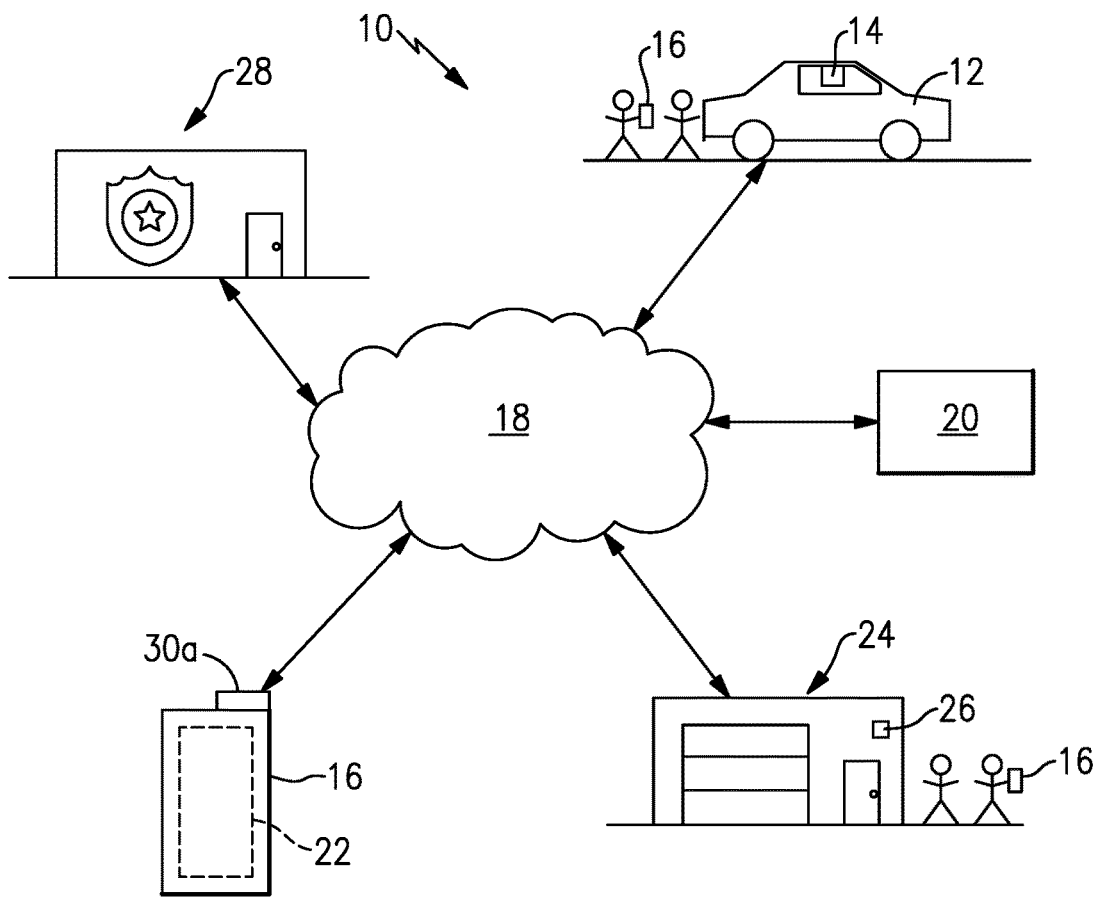
FIG. 1 is a schematic of a system for providing safety assistance during a vehicle test ride.

FIG. 1 illustrates a system 10 for providing safety assistance on a vehicle test ride. Dealerships and rental fleets rely upon salespeople and other office staff to provide customer access to vehicles 12. Particularly, in the case of a dealership, a salesperson will accompany a prospective customer on a test ride.

One type of access system utilizes a lockbox 14, which is a locking device which may be mounted on a window of a vehicle or a locking cabinet inside a building, for example.

Figure 2:
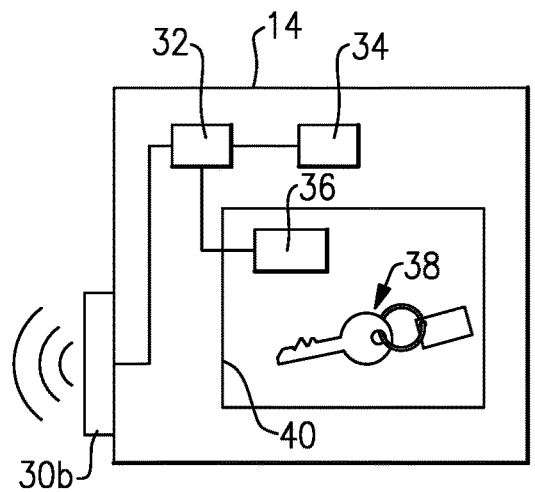
FIG. 2 is a schematic of an example lockbox associated with the vehicle.

An example lockbox 14 is schematically illustrated in FIG. 2. The lockbox 14 has a compartment 40 within which a vehicle access component 38 such as a key and/or fob are securely locked. Returning to FIG. 1, in one example, the lockbox 14 can be opened in response to a request signal using a software application 22 on a computerized device 16, such as a smartphone or tablet, which includes a processor, a memory, a display, a motion sensor and a vibration device, for example. Optionally, the lockbox 14 may include one or more buttons that allow the user to enter a code or provide another access credential before allowing the lockbox 14 to open and provide the user access to the key or fob.

The computerized device 16 includes a communication system 30 (FIG. 1) that connects to a central server 20 through a data network 18, such as the internet. The communication system 30 may be short-range wireless for communications between the device 16 and lockbox 14 or may be long-range wireless for communication between the device 16 through network 18 to the central server 20. Lockbox 14 may also be able to communicate to the central server 20 using a long-range communication technology. Short-range wireless communication may include IrDA, Bluetooth, Wi-Fi, Near Field Communication, RFID, or other well known short-range technologies. Long-range communication may include cellular, wi-fi, LAN/WLAN, LoRA, SigFox, or other radio type technologies. The central server 20 includes software allowing the central server 20 to receive vehicle access requests or receive notifications that a vehicle was accessed, and schedule a specific vehicle 12 to service the temporary access request according to any known software configuration. In some examples the temporary access request can be a test drive request from a sales agent for a prospective purchaser sent from their device 16. Based on an electronic identity of the key 38 that is readable by the box 14, or based on an identity of the box 14 itself, the vehicle they are attempting to access can be identified. In alternative examples, the temporary access request can be a scheduled rental duration of the vehicle 12. In yet further examples, the temporary access request can be any authorized temporary access request configured by the central server 20. The computerized device 16 may also communicate through the central server 20 and/or the data network 18 with remote locations, such as a dealership or rental fleet office 24 and/or a building 28 that houses rescue personnel, such as police, fire, EMS or other personnel that may be suitable for responding to an alert. The remote location may be a server, another cell phone, a cloud service, a computer running in the dealership office, or any other computing device that is remote from the device 16 but reachable via a cellular, LAN, WAN, or Internet protocol. The office 24 may include a surveillance system 26. The remote location has an alert receiver configured to receive an alert signal originating from the computerized device 16.

With continued reference to FIG. 1, FIG. 2 schematically illustrates the lockbox 14 of FIG. 1 in greater detail. The lockbox 14 includes a computer processor 32 and a memory 34. The communication system 30*b* interfaces between the lockbox 14 and the device 16. The communication system 30*b* may be the same type of device as the communication system 30*a*. In some examples, the communications system 30*b* has an input/output (I/O) system that connects to the central server 20 through the data network 18 and allows the processor 32 to communicate with the central server 20. In example embodiments, the communication system 30*b* can include a short range wireless communication system, such as a Bluetooth communication system. The short range wireless communication system allows the user to authenticate themselves as the vehicle requestor by communicating with the lockbox 14 using the software application 22. In some examples the lockbox 14 is configured to provide multi-factor authentication and ensure that only the person requesting the temporary access to the vehicle is granted that access. In one embodiment the device 16 communicates directly to the lockbox 14 through interface 30*a*, 30*b* and implements an authentication protocol to open the lockbox to obtain the vehicle access component 38. In another embodiment, the request is sent from the device 16 to the server 20 which then authenticates the request and if authenticated another message is sent from the server 20 to the lockbox 14 through network 18 and interface 30*a*, 30*b*. Authenticating a request is well known in the art of access control and includes the use of encryption and decryption to ensure the privacy of a message, verifying signatures of a message to ensure the integrity of the message, and comparing identifiers to ensure the access rights of the requester. The authentication process may also include verifying the identity of the requester through their knowledge of a PIN or Passcode, through biometric verification, or through any other well known identity comparison such as cell phone ID, MAC address, unique identifiers, and so on. These identifiers and encryption keys may be stored on the device 16, server 20, or lockbox 114 and shared between them securely as needed to complete the authentication of the request.

Figure 3:
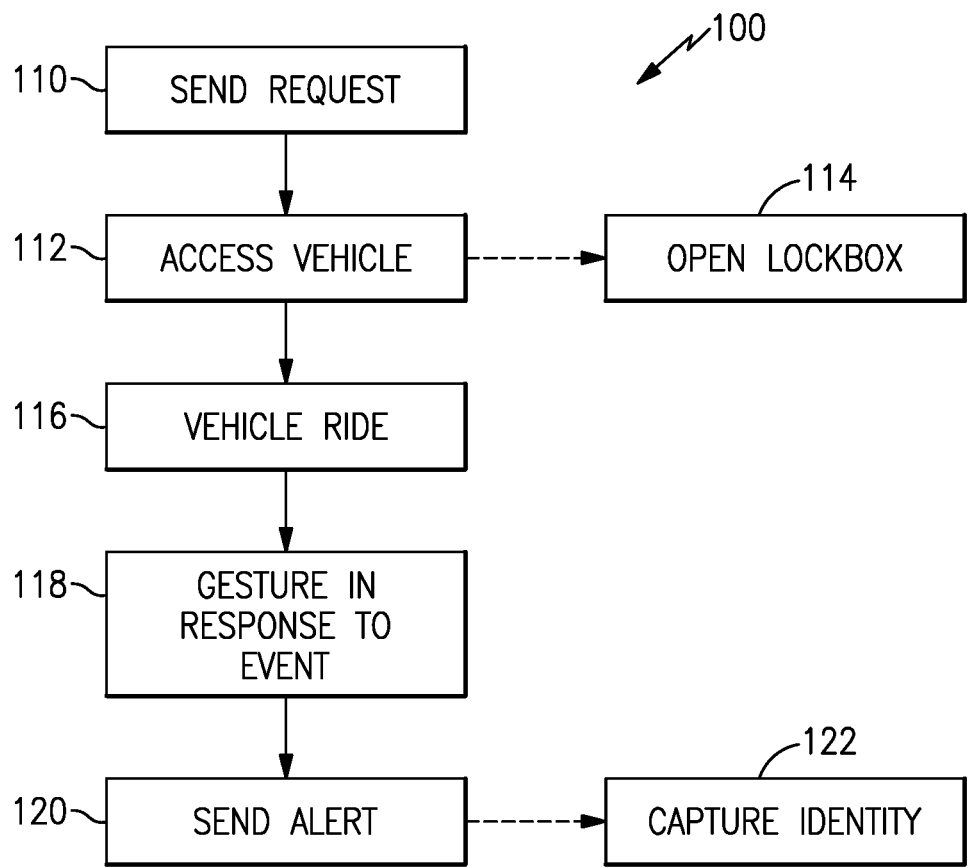
FIG. 3 is a method of providing assistance.

A method 100 of providing safety assistance is shown in FIG. 3. A request signal (block 110) is sent to access the vehicle (block 112), for example, by opening the lockbox 114 to access the vehicle access component 38 (block 114).

Figure 4:
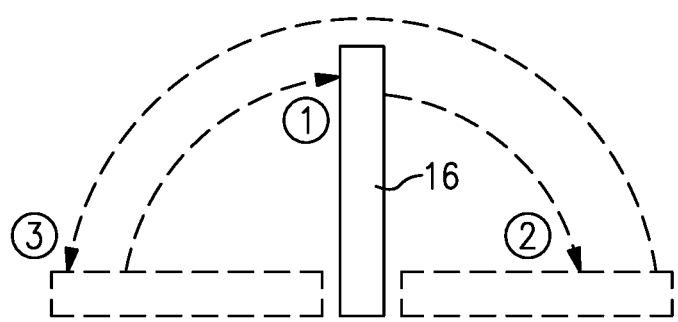
FIG. 4 is a schematic illustration of a gesture used to summon assistance.

The software application 22 has a safety protocol configured to be initiated in connection with the request signal, for example, before, during or after the lockbox 14 is opened. The salesperson then accompanies the prospective customer on a test ride 116, for example. The safety protocol is configured to send the alert signal to the remote location in response to a gesture by the salesperson with the computerized device 16 if the salesperson experiences a dangerous or threatening event (block 118). In one example, the gesture is designed to be somewhat subtle so as to not attract the attention of the prospective customer. For example, as shown in FIG. 4, the gesture may correspond to a sequence of computerized device movements includes moving the computerized device 16 from a first position (1) in a first direction 90° to a second position (2), and then from the second position (2) in 180° in a second direction opposite the first direction to a third position (3), and then from the third position (3) 90° back to the first position (1). The gesture may need to be completed in a specified amount of time to be valid. The software application 22 may be configurable to recognize other gestures. Moreover, the gestures need not be precise, for example, +/−30° from the intended position.

The computerized device 16 may confirm to the user that the gesture was recognized and the alert signal was sent, for example, by vibrating the computerized device 16. The alert signal is sent to the remote location (block 120). The alert signal may be, for example, 1) a phone call with pre-recorded message, 2) a text message, 3) an email, 4) a message to the server, 5) a message to a person, 6) a trigger of an alarm in the dealership location, or 7) a message to authorities (i.e. police). In the example of a dealership, the surveillance equipment 26 may be configured to record a return of the prospective customer in response to the alert signal for identification to authorities (block 122).

Alternatively or additionally, an alarm on at least one of the computerized device 16 and/or the vehicle 12 may be activated. The alarm on the vehicle may be activated by a messages sent from the device 16 to the vehicle directly over interface 30*a*, 30*b* (not shown on the vehicle in FIG. 1) or by a message sent from the central server 20 to the vehicle 12 over network 18. The vehicle location may also be sent to the remote location for determining where the event is occurring. The vehicle location may be determined by the current location of the mobile device 16. GPS may be enabled on the device 16 throughout the process 100 and specifically for step 120 to identify the current location when the alert is sent. Vehicle information can be included in the alert message, such as the vehicle being driven (e.g., VIN and vehicle make, model, color), route traveled and audio prior to the gesture. The computerized device 16 and/or the vehicle 12 may record video and/or audio in response to the alert signal. The recording or live video and/or audio may also be sent to the central server 20 or remote location 28. After step 120, the mobile device may determine its location on a periodic basis and continue to report this to the central server 20 or remote location 28.

In most cases, the test drive occurs without incident. Thus, the lockbox 14 may be configured to terminate the safety protocol when the vehicle access component 38 is returned to the lockbox 14 or within a short time thereafter or when the sales person requests the procedure to be terminated, for example through the application 22.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of providing safety assistance on a test ride of a vehicle, comprising:
   opening a locking device to provide access to a vehicle access component;
   initiating a safety protocol with a computerized device in response to the locking device opening step;
   operating the vehicle with the vehicle access component;
   performing a gesture with the computerized device to summon assistance.

2. The method of claim 1, wherein the opening step is performed using the computerized device.

3. The method of claim 1, wherein the vehicle access component is at least one of a key and/or a key fob.

4. A method of providing safety assistance on a test ride of a vehicle, comprising:
   opening a locking device to provide access to a vehicle access component;
   initiating a safety protocol with a computerized device;
   operating the vehicle with the vehicle access component;
   performing a gesture with the computerized device to summon assistance, wherein the summoned assistance includes a step of documenting a return of a prospective customer to a building.

5. The method of claim 1, wherein the summoned assistance includes a step of activating an alarm on at least one of the computerized device and/or the vehicle.

6. The method of claim 1, wherein the summoned assistance includes a step of alerting a remote location including at least an office and/or a rescue personnel.

7. The method of claim 6, wherein the alert includes sending a location of the vehicle.

8. The method of claim 1, wherein the summoned assistance includes a step of providing a video and/or an audio recording in the vehicle with the computerized device.

9. A method of providing safety assistance on a test ride of a vehicle, comprising:
   opening a locking device to provide access to a vehicle access component;
   initiating a safety protocol with a computerized device;
   operating the vehicle with the vehicle access component;
   performing a gesture with the computerized device to summon assistance; and
   terminating the safety protocol when the vehicle access component is returned to the locking device.

10. A method of providing safety assistance on a test ride of a vehicle, comprising:
    opening a locking device to provide access to a vehicle access component;
    initiating a safety protocol with a computerized device;
    operating the vehicle with the vehicle access component;
    performing a gesture with the computerized device to summon assistance; and
    confirming the gesture to the user with the computerized device.

11. A method of providing safety assistance on a test ride of a vehicle, comprising:
    opening a locking device to provide access to a vehicle access component;
    initiating a safety protocol with a computerized device;
    operating the vehicle with the vehicle access component;
    performing a gesture with the computerized device to summon assistance;
    wherein the initiating step includes monitoring for a predetermined gesture from the user associated with an emergency event; and
    wherein the initiating step includes monitoring for a predetermined gesture from the user associated with an emergency event, wherein the gesture is a sequence of computerized device movements between desired computerized device orientations.

12. The method of claim 11, wherein the sequence of computerized device movements includes moving the computerized device from a first position in a first direction 90° to a second position, and then from the second position in 180° in a second direction opposite the first direction to a third position, and then from the third position 90° back to the first position.

13. A safety assistance system for use during vehicle test rides, comprising:
    a locking device containing a vehicle access component, the locking device configured to provide access to the vehicle access component in response to a request signal;
    a remote location having an alert receiver configured to receive an alert signal; and a computerized device having a software application configured to interface with the locking device, the software application having a safety protocol configured to be initiated in connection with the request signal, the safety protocol configured to send the alert signal in response to a user gesture with the computerized device.

14. The safety assistance system of claim 13, wherein the computerized device is configured to send the request signal.

15. The safety assistance system of claim 13, wherein the remote location corresponds to an office having surveillance equipment, and the surveillance equipment is configured to record a return of a prospective customer in response to the alert signal.

16. The safety assistance system of claim 13, wherein the remote location houses rescue personnel.

17. The safety assistance system of claim 13, wherein the computerized device is configured to confirm the user gesture to the user.

18. The safety assistance system of claim 13, wherein the locking device is configured to terminate the safety protocol when the vehicle access component is returned to the locking device.

* * * * *